United States Patent
Kristoffersen et al.

(10) Patent No.: US 7,750,983 B2
(45) Date of Patent: Jul. 6, 2010

(54) STRETCHED FILM FOR STEREOSCOPIC 3D DISPLAY

(75) Inventors: Martin Kristoffersen, Maplewood, MN (US); Michael J. Sykora, Deer Park, WI (US); John C. Schultz, Afton, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 104 days.

(21) Appl. No.: 12/243,052

(22) Filed: Oct. 1, 2008

(65) Prior Publication Data

US 2009/0091668 A1 Apr. 9, 2009

Related U.S. Application Data

(60) Provisional application No. 60/977,462, filed on Oct. 4, 2007.

(51) Int. Cl.
G02F 1/1335 (2006.01)
H04N 13/00 (2006.01)

(52) U.S. Cl. .............................. 349/15; 349/16; 349/41; 349/58; 349/61

(58) Field of Classification Search .................. 349/15, 349/11, 13, 14, 16, 41, 58, 57, 61, 95, 122, 349/124, 149, 200, 193
See application file for complete search history.

(56) References Cited

U.S. PATENT DOCUMENTS

| | | | | |
|---|---|---|---|---|
| 6,046,849 A * | 4/2000 | Moseley et al. | ............. | 359/465 |
| 6,437,915 B2 * | 8/2002 | Moseley et al. | ............. | 359/465 |
| 7,210,836 B2 | 5/2007 | Sasagawa et al. | ........... | 362/606 |
| 7,530,721 B2 | 5/2009 | Mi et al. | ..................... | 362/606 |
| 2002/0001128 A1 * | 1/2002 | Moseley et al. | ............. | 359/465 |
| 2003/0231264 A1 | 12/2003 | Kim | ............................ | 349/61 |
| 2005/0052750 A1 | 3/2005 | King et al. | .................... | 359/619 |
| 2005/0276071 A1 | 12/2005 | Sasagawa et al. | ........... | 362/607 |
| 2007/0002132 A1 * | 1/2007 | Kim et al. | ...................... | 348/57 |
| 2007/0127144 A1 | 6/2007 | Gao | ........................... | 359/820 |
| 2007/0195409 A1 * | 8/2007 | Yun et al. | ................... | 359/462 |
| 2008/0084513 A1 * | 4/2008 | Brott et al. | .................... | 349/15 |
| 2009/0091668 A1 * | 4/2009 | Kristoffersen et al. | ........ | 349/15 |
| 2009/0322860 A1 * | 12/2009 | Zhang et al. | .................. | 348/46 |

FOREIGN PATENT DOCUMENTS

| | | |
|---|---|---|
| JP | 2000-056303 | 2/2000 |
| JP | 2001-066547 | 3/2001 |

OTHER PUBLICATIONS

U.S. Appl. No. 60/977,462, filed Oct. 4, 2007, Titled: Stretched Film for Stereoscopic 3D Display.
U.S. Appl. No. 61/057,434, filed May 30, 2008, Titled: Suspended Optical Film.
U.S. Appl. No. 60/947,776, filed Jul. 3, 2007, Titled: Optically Transmissive Composite Film Frame.
Ishikawa et al. "New Design for a Highly Collimating Turning Film," Eastman Kodak Company, SID 06 Digest, p. 514-517, 2006.

* cited by examiner

*Primary Examiner*—Brian M Healy

(57) ABSTRACT

A stereoscopic 3D display with stretched film. The display includes a liquid crystal display panel, drive electronics configured to drive the liquid crystal display panel with alternating left eye and right eye images, and a light guide and a backlight positioned to provide light to the liquid crystal display. A frame is positioned between the liquid crystal display panel and the light guide, and a 3D film is stretched over the frame.

20 Claims, 4 Drawing Sheets

STRETCHED FILM FOR STEREOSCOPIC 3D DISPLAY

CROSS REFERENCE TO RELATED APPLICATION

This application claims the benefit of U.S. Provisional Patent Application No. 60/977,462, filed Oct. 4, 2007, the disclosure of which is incorporated by reference herein in its entirety.

FIELD

The present disclosure relates to a backlit liquid crystal display apparatus and particularly to displaying stereo 3D images using a stretched film.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

BRIEF SUMMARY

The present disclosure relates to a backlit liquid crystal display apparatus and particularly to displaying stereo 3D images using a liquid crystal display device with a stretched 3D film.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

Figure 1:
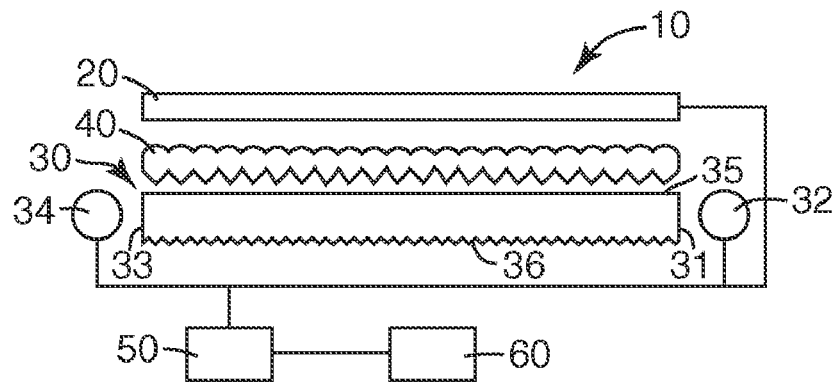
FIG. 1 is a schematic side view of an illustrative display apparatus.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz.

A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33, and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having a linear lenticular structure on a first side and a linear prismatic structure on an opposing side. The linear lenticular structure and the linear prism structure are parallel. The double sided prism film 40 transmits light from the scanning backlight to the liquid crystal display panel 20 at the proper angles such that a viewer perceives depth in the displayed image. In many embodiments, the double sided prism film 40 is spaced apart from the liquid crystal display panel 20 and/or spaced apart from the backlight 30. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
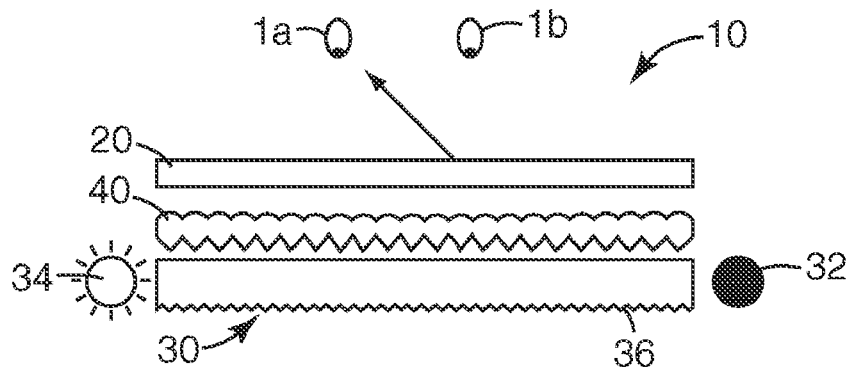
FIG. 2A and FIG. 2B are schematic side views of an illustrative display apparatus in operation.
Figure 2B:
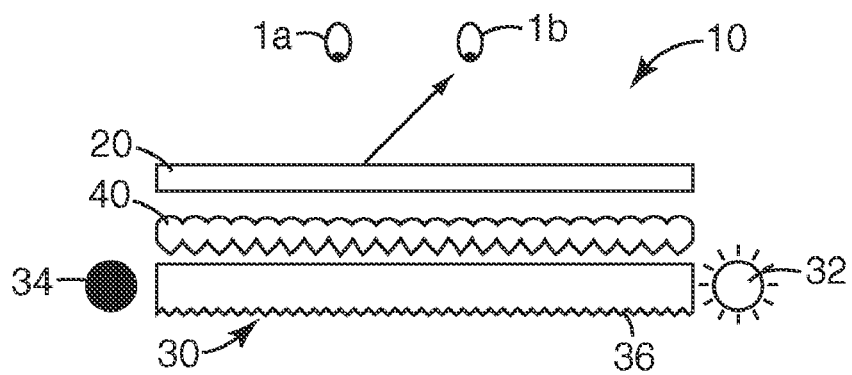

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every ⅟₆₀ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

The backlight 30 and associated light sources 32, 34 described herein can be very thin (thickness or diameter) such as, for example, less then 5 millimeters, or from 0.25 to 5 millimeters, or from 0.5 to 4 millimeters, or from 0.5 to 2 millimeters.

Stretched Film in 3D Display

An embodiment includes 3D film, such as the double sided prism film described and identified above, stretched and attached to a frame in order to maintain a flat film with a vertically oriented or linear stereo edge. This embodiment helps maintain dimensional stability of a 3D film for varying environmental conditions, such as temperature, humidity, or other conditions. The frame must be designed to withstand the compressive stresses due to the stretched film without buckling. In many embodiments the frame is a rigid from such as, for example, a metal frame. In some embodiments, the rigid frame is aluminum. The stretched film can be attached to a frame with adhesive or with elastic tape. In many embodiments, the adhesive or elastic tape is a substantially continuous adhesive element about a perimeter of a frame opening.

A linear, vertically oriented stereo edge of a 3D film is important in order to create a good 3D viewing experience for an autostereoscopic display. It has been shown that small wrinkles in the film will cause a curvy stereo edge causing a degraded 3D viewing experience for a viewer. Wrinkles can be caused by a thermal expansion mismatch either between the film and mounting frame or between different layers of the film. Wrinkles can also be caused by creep of the film. In many embodiments, the 3D film fixed to the rigid frame is substantially free of wrinkles or free of wrinkles so as to provide a straight, vertically oriented stereo edge of the 3D film. In many embodiments, the 3D film fixed to the rigid frame was stretched by less than 1%, or in a range from 0.1 to 1%, as excessive stretching could affect the 3D characteristic of the display.

Figure 4A:
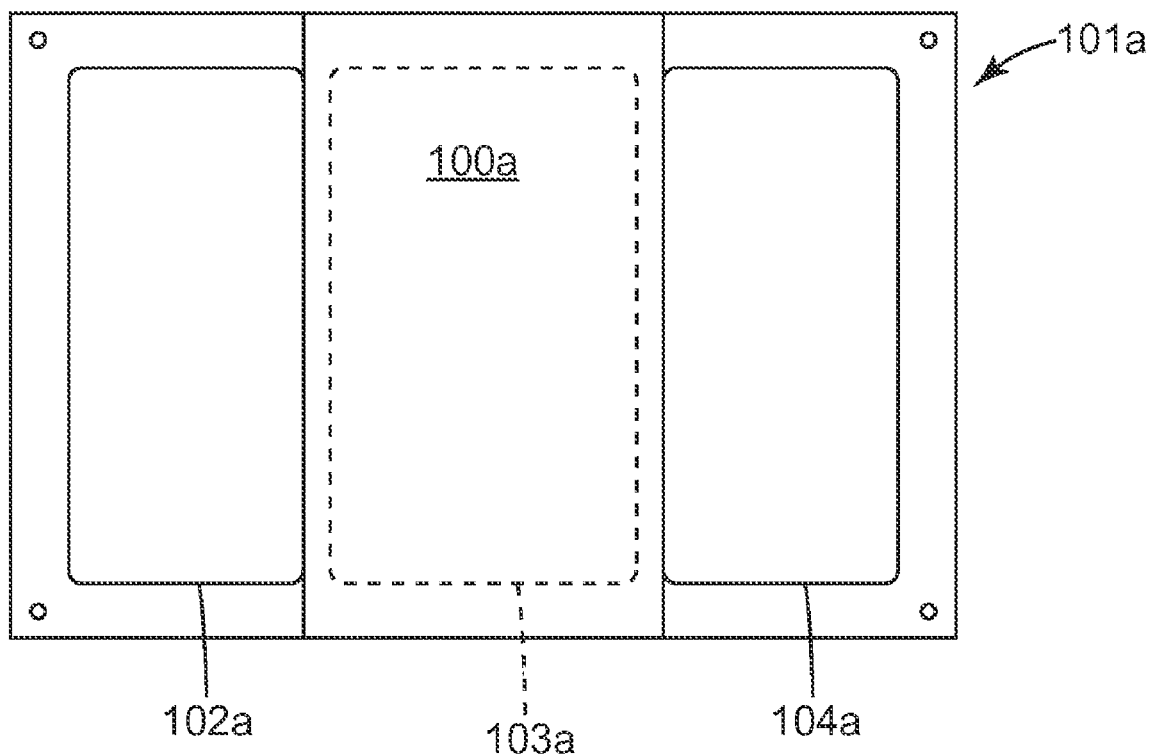
FIG. 4(a) is a schematic drawing of a stretched 3D film attached to an aluminum frame.
Figure 5A:
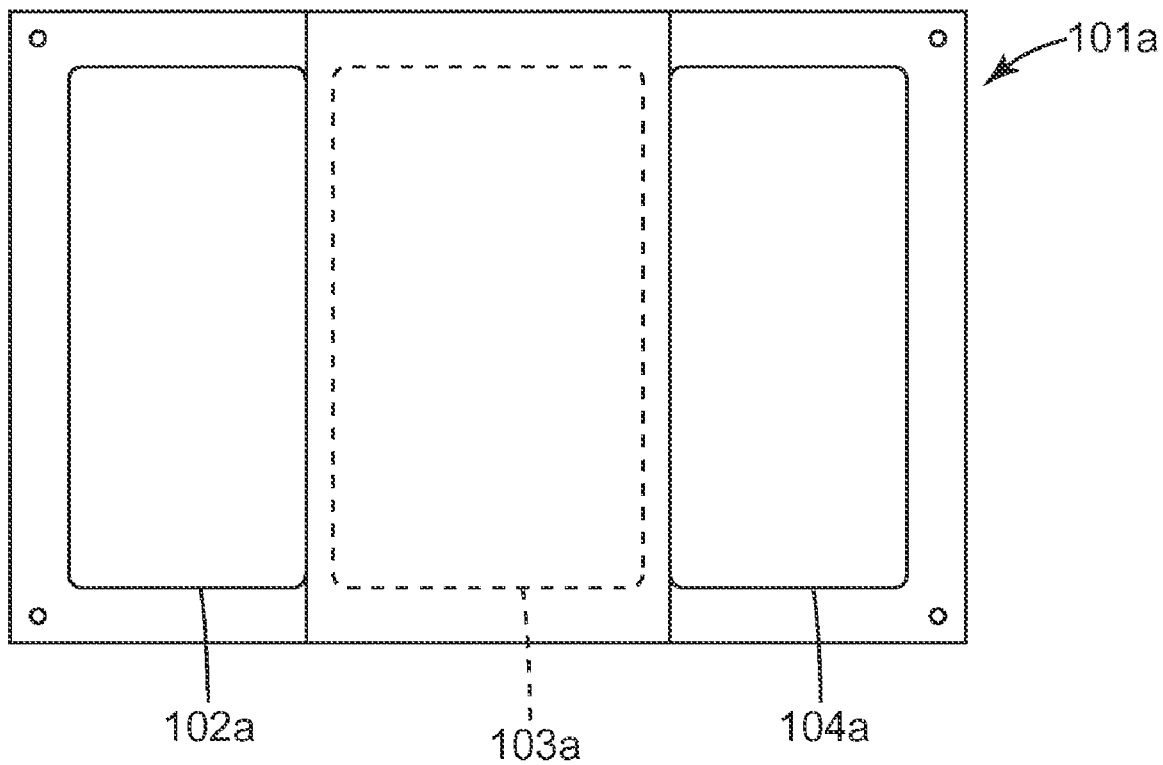
FIG. 5(a) is a schematic drawing of a stretched 3D film attached to an aluminum frame after testing in a thermal shock chamber.

In some embodiments, the 3D film can be fixed to a frame that includes two or more display openings as illustrated in FIG. 4a and FIG. 5a. The 3D film can be stretched over at least one of the display openings. In some embodiments, the 3D film is not stretched of at least one of the display openings.

Example 1

Figure 3A:
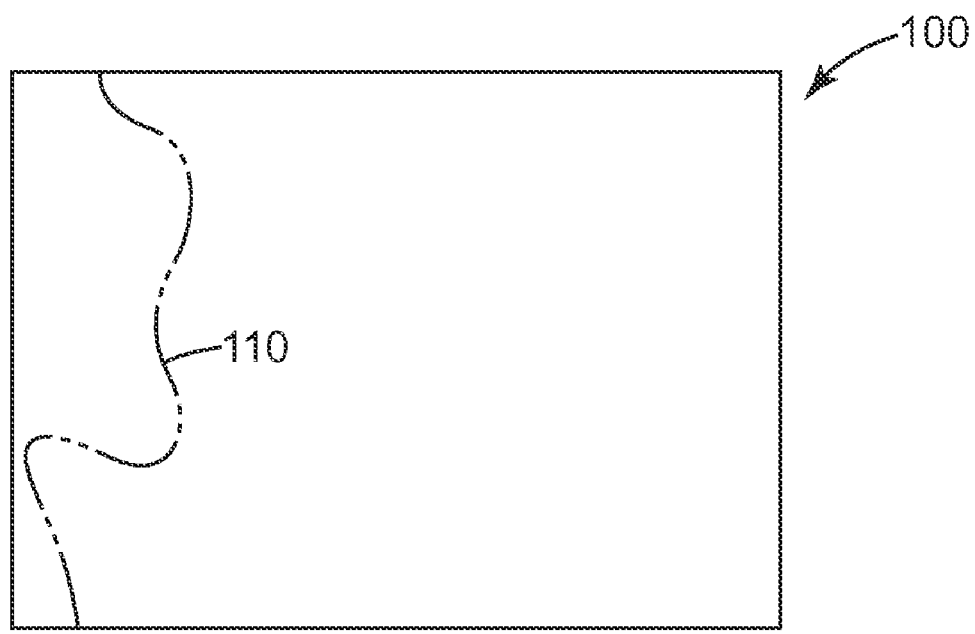
FIG. 3(a) is a schematic drawing of a display with a wrinkled 3D film.
Figure 3B:
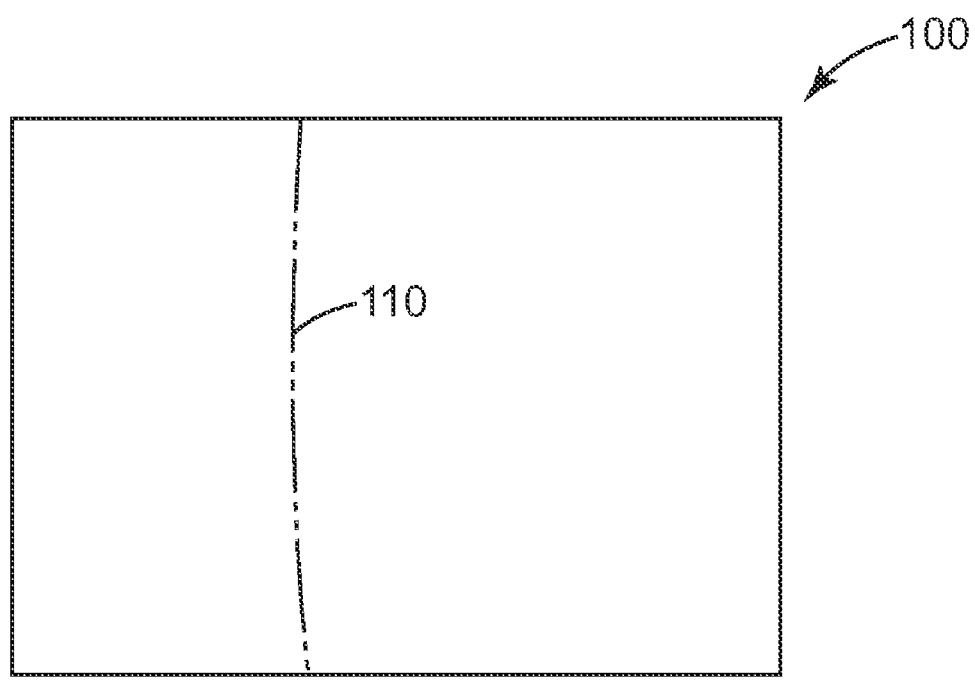
FIG. 3(b) is a schematic drawing of a display with a nearly flat 3D film.

The images in FIGS. 3(a) and 3(b) show the effect of 3D film flatness on the stereo edge 110. A display 100 with wrinkled film and a clearly curvy stereo edge 110 is seen in FIG. 3(a) and a nearly flat 3D film with a nearly straight and vertical stereo edge 110 is seen in FIG. 3(b).

Example 2

Figure 4B:
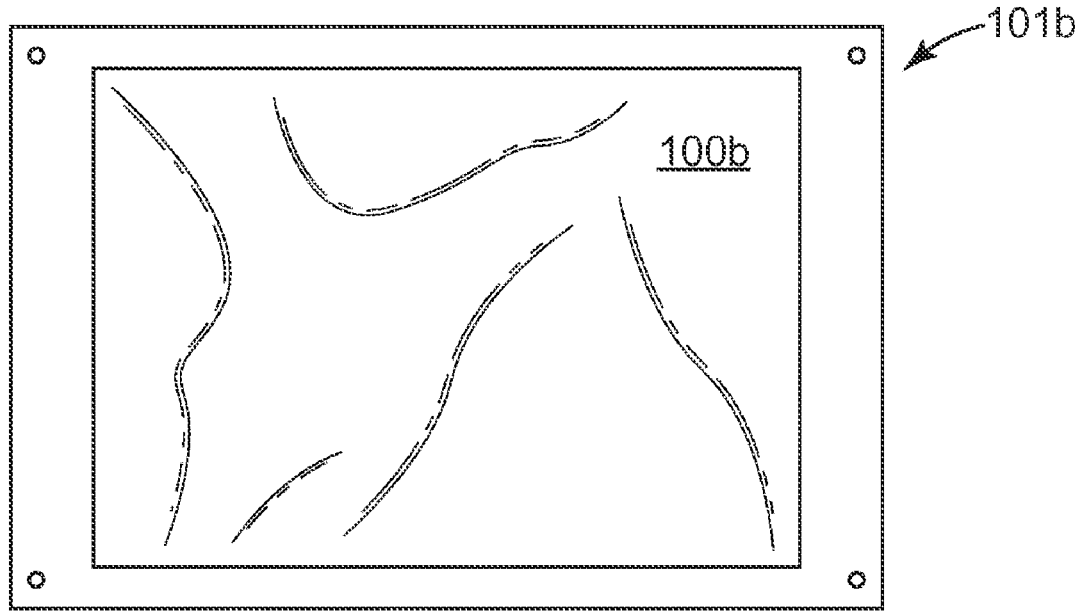
FIG. 4(b) is a schematic drawing of an unstretched 3D film attached to a polymeric (Delrin) frame.

A stretched film sample was made by first stretching a piece of 3D film 100a in x- and y-directions. The film sample was then attached to a center section 103a of an aluminum frame 101a with an adhesive commercially available under the trade designation 3M Scotch-Weld Epoxy DP100, from 3M Company, St. Paul, Minn. The left 102a and right 104a sections were not covered in this example, however, these outer sections 102a, 104a can be covered with an unstretched film, as desired. Once the epoxy was cured, the excess film was trimmed from the frame and the sample was cycled between 66° C. and room temperature. FIG. 4(a) shows the sample after two cycles. For a comparison, FIG. 4(b) shows an unstretched film 100b attached to a polymeric material (Delrin) frame 101b that was heated to 50° C. and cooled to room temperature. As illustrated, the inventive example FIG. 4(a) did not posses detectable wrinkles, while the comparative example FIG. 4(b) shows substantial wrinkling.

Example 3

Figure 5B:
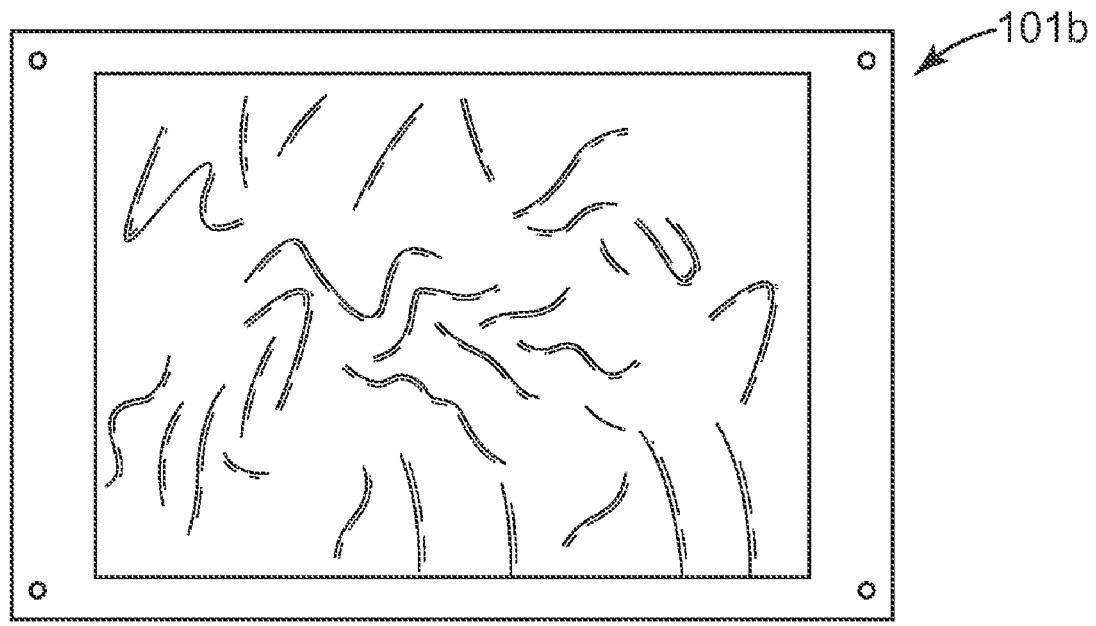
FIG. 5(b) is a schematic drawing of an unstretched 3D film standard sample after testing in the thermal shock chamber.

Another stretched film sample 100a was made similar to the inventive example 2 and placed in the thermal shock chamber where the temperature was cycled between −35° C. and 85° C. As described above, the left 102a and right 104a sections were not covered with film and the center section 103a was covered with the stretched 3D film. A second piece of film 100b was tested with the standard three-sided tape down thermal shock test. FIGS. 5(a) and 5(b) show the difference between a stretched 3D film sample 100a and a standard three-sided tape down sample 100b after thermal shock testing. As illustrated, the inventive example FIG. 5(a) did not posses detectable wrinkles, while the comparative example FIG. 5(b) shows substantial wrinkling.

Thus, embodiments of the STRETCHED FILM FOR STEREOSCOPIC 3D DISPLAY are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A stereoscopic 3D display, comprising:
   a liquid crystal display panel;
   drive electronics configured to drive the liquid crystal display panel with alternating left eye and right eye images;
   a light guide and a backlight positioned to provide light to the liquid crystal display;
   a frame positioned between the liquid crystal display panel and the light guide; and
   a 3D film stretched over the frame.

2. The display of claim 1, wherein the frame includes two or more display openings.

3. The display of claim 1, wherein the frame is composed of aluminum.

4. The display of claim 1, wherein the 3D film comprises a double sided prism film.

5. The display of claim 1, wherein the 3D film is spaced apart from the liquid crystal display panel.

6. The display of claim 2, wherein the 3D film is stretched over at least one display opening and is not stretched over at least one display opening.

7. The display of claim 1, wherein the 3D film is adhered to the frame by a substantially continuous adhesive element.

8. The display of claim 1, wherein the 3D film is stretched in a range from 0.1 to 1%.

9. A stereoscopic 3D display, comprising:
   a liquid crystal display panel;
   drive electronics configured to drive the liquid crystal display panel with alternating left eye and right eye images;
   a light guide and a backlight positioned to provide light to the liquid crystal display;
   a rigid frame positioned between the liquid crystal display panel and the light guide; and
   a 3D film fixed to the frame, the 3D film being substantially free of wrinkles.

10. The display of claim 9, wherein the frame is composed of aluminum.

11. The display of claim 9, wherein the 3D film comprises a double sided prism film.

12. The display of claim 9, wherein the 3D film is spaced apart from the liquid crystal display panel.

13. The display of claim 9, wherein the 3D film is adhered to the frame by a substantially continuous adhesive element.

14. The display of claim 9, wherein the 3D film is stretched on the frame in a range from 0.1 to 1%.

15. A stereoscopic 3D display, comprising:
   a liquid crystal display panel;
   drive electronics configured to drive the liquid crystal display panel with alternating left eye and right eye images;
   a light guide and a backlight positioned to provide light to the liquid crystal display;
   a rigid frame positioned between the liquid crystal display panel and the light guide; and
   a 3D film fixed to the frame, the 3D film having a substantially linear stereo edge.

16. The display of claim 15, wherein the frame is composed of aluminum.

17. The display of claim 15, wherein the 3D film comprises a double sided prism film.

18. The display of claim 15, wherein the 3D film is spaced apart from the liquid crystal display panel.

19. The display of claim 15, wherein the 3D film is adhered to the frame by a substantially continuous adhesive element.

20. The display of claim 15, wherein the 3D film is stretched on the frame in a range from 0.1 to 1%.

* * * * *